've

United States Patent
Hashimoto

(12) United States Patent
(10) Patent No.: US 6,871,355 B1
(45) Date of Patent: Mar. 22, 2005

(54) CONDITIONAL ACCESS SYSTEM OF CATV

(75) Inventor: Kazunori Hashimoto, Tokyo (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/546,191

(22) Filed: Apr. 10, 2000

(30) Foreign Application Priority Data

Apr. 9, 1999 (JP) .......................................... 11-102392

(51) Int. Cl.⁷ .......................... H04N 7/16; H04N 7/167; H04N 7/173
(52) U.S. Cl. ............................. 725/25; 725/27; 725/31; 725/131; 725/139; 725/151; 380/212; 380/241; 380/242
(58) Field of Search .......................... 725/25–31, 131, 725/139, 151; 380/241–242, 212

(56) References Cited

U.S. PATENT DOCUMENTS

| 5,036,537 A | | 7/1991 | Jeffers et al. |
| 5,565,909 A | | 10/1996 | Thibadeau et al. |
| 5,600,378 A | * | 2/1997 | Wasilewski ................. 348/468 |
| 5,659,350 A | * | 8/1997 | Hendricks et al. .......... 725/116 |
| 5,742,677 A | | 4/1998 | Pinder et al. |
| 5,982,411 A | * | 11/1999 | Eyer et al. ..................... 725/49 |
| 5,990,927 A | * | 11/1999 | Hendricks et al. .......... 725/132 |
| 6,157,719 A | * | 12/2000 | Wasilewski et al. ........ 380/210 |
| 6,160,545 A | * | 12/2000 | Eyer et al. ................... 345/721 |
| 6,256,393 B1 | * | 7/2001 | Safadi et al. ............... 380/232 |
| 2002/0094084 A1 | * | 7/2002 | Wasilewski et al. ........ 380/241 |

FOREIGN PATENT DOCUMENTS

WO  WO 99/07147  2/1999

* cited by examiner

Primary Examiner—John Miller
Assistant Examiner—Michael W. Hoye
(74) Attorney, Agent, or Firm—Sughrue Mion, PLLC

(57) ABSTRACT

A CATV conditional access system equipped with a digital head end which transmits picture signals of digital programs in a batch mode to terminals provided within a plurality of areas. This digital head end transmits area codes for the respective areas and data about a list table to the terminals employed in the plural areas. In this list table, digital programs of not-yet-provided services for the respective areas are indicated. The area codes are used to recognize such areas belonging to the own terminals. Each of the terminals excludes the picture signal of the digital program of the not-yet-provided service in the related area by identifying the area code with the list table of the not-yet-service digital channel.

7 Claims, 6 Drawing Sheets

CONDITIONAL ACCESS SYSTEM OF CATV

BACKGROUND OF THE INVENTION

1. Field of the Invention

The present invention relates to a CATV conditional access system in which digital programs are provided in a batch mode from a single digital head end to a plurality of areas.

2. Description of the Related Art

Very recently, community antenna television sysetms (CATVs) are popularized while multi-media have been developed.

As indicated in FIG. 8, this conventional CATV system is arranged as follows. That is, an analog head end (control center) 1 is installed in each of areas, terminals 2 set into homes of subscribers are connected via cables 3 to this analog head end 1, and then an analog picture signal (video/audio signal) is distributed from this analog head end 1 to the respective terminals 2 via a predetermined picture frequency channel.

Contrary to such an analog CATV system, a digital CATV system will be popularized, because of various needs, for instance, multi-channel broadcasting system, video-on-demand (VOD), and bidirectional communications.

While such an analog CATV system is transferred to a digital CATV system, in the case that an operation station of an existing analog CATV system starts a digital CATV broadcasting service, this operation station is required to commence distributions of digital picture signals without interrupting the distribution services to the subscribers which presently receive the existing analog broadcasting programs.

To meet such a need, the applicant of the present application has proposed such a novel digital integration type CATV system as shown in FIG. 6, since the investment amount required in such a case that the operation station of the existing analog CATV system is transferred from the analog CATV system to the digital CATV system is reduced, and further, the problem such as the installing space occurred when the digital CATV system is newly installed is solved. Accordingly, the present analog CATV system can be smoothly transferred to the digital CATV system.

In this digital integration type CATV system, one digital head end 10 is installed with respect to a plurality of analog head ends 1A, 1B and 1C, and then this digital head end 10 will supply digital programs in a batch mode to the respective analog head ends 1A, 1B and 1C. The plural analog head ends 1A, 1B and 1C are installed in the respective areas A, B and C where the existing analog CATV system has been constructed.

Then, picture signals of digital programs transmitted from this digital head end 10 are distributed by the respective analog head ends 1A, 1B and 1C via the cables 3 to the respective terminals 2 provided in the areas, in combination with the analog programs distributed from these analog head ends 1A, 1B and 1C, while using an empty channel thereof.

In this case, as to an MPEG TS (Transport Stream) used to transmit a picture signal of a digital program, picture signals of plural channels are usually multiplexed on a single stream.

As a result, in the above-explained so-called "digital integration type CATV system", when the digital head end 10 provides the digital programs in a-batch mode, even if the structures of the digital programs are different from each other in the respective areas, then the same digital programs having the different program structures would be distributed to all of these areas A, B and C, as illustrated in FIG. 7.

As a consequence, when a digital integration type CATV system is accomplished, structures of digital programs should be unified in each area. Also, even when the structures of the digital programs are not unified, since such a digital program which is not provided in each of the areas is distributed from each of the analog head ends to terminals, the following problem necessarily occurs. That is, only uniform services of the digital programs can be allowed to be provided in the respective areas.

SUMMARY OF THE INVENTION

The present invention has been made to solve the above-explained problem in the conventional CATV system in which the digital programs having the different program structures are provided in a batch mode from the digital head end to a plurality of areas.

In other words, the present invention has an object to provide such a CATV conditional access system capable of providing independent program structures of digital programs in each of areas even in such a case that a digital head end provides the digital programs having different program structures to a plurality of areas.

To achieve the above-explained object, according to the invention, there is provided a CATV conditional access system comprising a digital head end for transmitting picture signals of digital programs in a batch mode to terminals provided in a plurality of areas, wherein the digital head end transmits both an area code for every area and program data to the terminals employed in the plurality of areas, the area code being used to recognize such an area to which each of the terminals belongs, and digital programs of not-yet-provided services in the respective areas being indicated every area in the program data, and each of the terminals identifies the area code with the program data so as to exclude a picture signal of a digital program of a not-yet-provided service in such an area to which the terminal belongs, from the picture signals of the digital programs transmitted from the digital head end.

Further, according to the invention, there is provided a CATV conditional access method comprising the steps of: providing a digital head end for transmitting picture signals of digital programs to terminals provided in a plurality of areas; transmitting both an area code for every area and program data to the terminals employed in the plurality of areas, the area code being used to recognize such an area to which each of the terminals belongs, and digital programs of not-yet-provided services in the respective areas being indicated every area in the program data; and identifying the area code with the program data so as to exclude a picture signal of a digital program of a not-yet-provided service in such an area to which the terminal belongs, from the picture signals of the digital programs transmitted from the digital head end.

DETAILED DESCRIPTION OF THE PREFERRED EMBODIMENT

Figure 1:
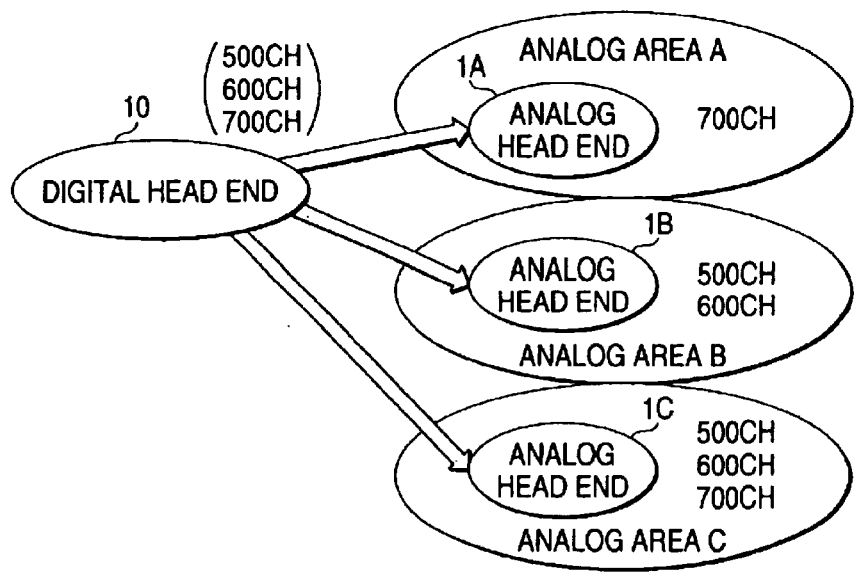
FIG. 1 is a system structural diagram for showing an example of an embodiment of the present invention.

Referring now to the drawings, a preferred embodiment of the present invention will be described more in detail.

FIG. 1 is a system structural diagram for representing an example of a CATV conditional access system according to an embodiment of the present invention.

In FIG. 1, a digital head end 10 transmits a digital picture signal to analog head ends 1A, 1B and 1C of the respective areas A, B and C. This digital head end 10 transmits the digital picture signal to the respective areas A, B and C in a batch mode. In this example, as to the digital picture signal, signals of three channels (500ch, 600ch and 700ch) are multiplexed on a single stream of MPEG TS.

Since the digital picture signal transmitted from this digital head end 10 is modulated by way of QAM, this digital picture signal can be distributed to the respective terminals provided within the areas A, B and C, without being processed in the analog head ends 1A, 1B and 1C of the respective areas A, B and C.

At this time, in such a case that program structures of digital programs to be supplied to subscribers are different from each other in the respective areas A, B and C, each of the analog head ends 1A, 1B and 1C cannot exclude only a digital picture signal of such a channel which is not provided in this area from a plurality of channels. These plural channels are multiplexed on a single stream of MPEG TS and then are transmitted from the digital head end 10. However, each of these analog head ends 1A, 1B and 1C distributes digital programs of all channels to the terminals.

As a consequence, in this CATV conditional access system, since the terminals are set every areas A, B and C are set, such a digital picture signal of a channel which is not provided in the respective areas A, B and C may be excluded.

Figure 2:
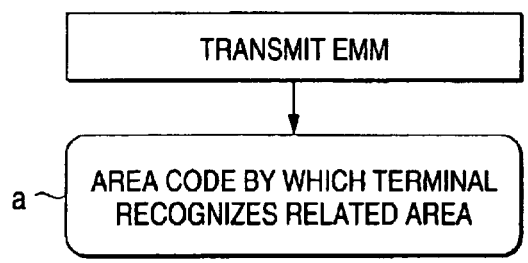
FIG. 2 is a conceptional diagram for explaining setting operation of a terminal in this example.
Figure 3:
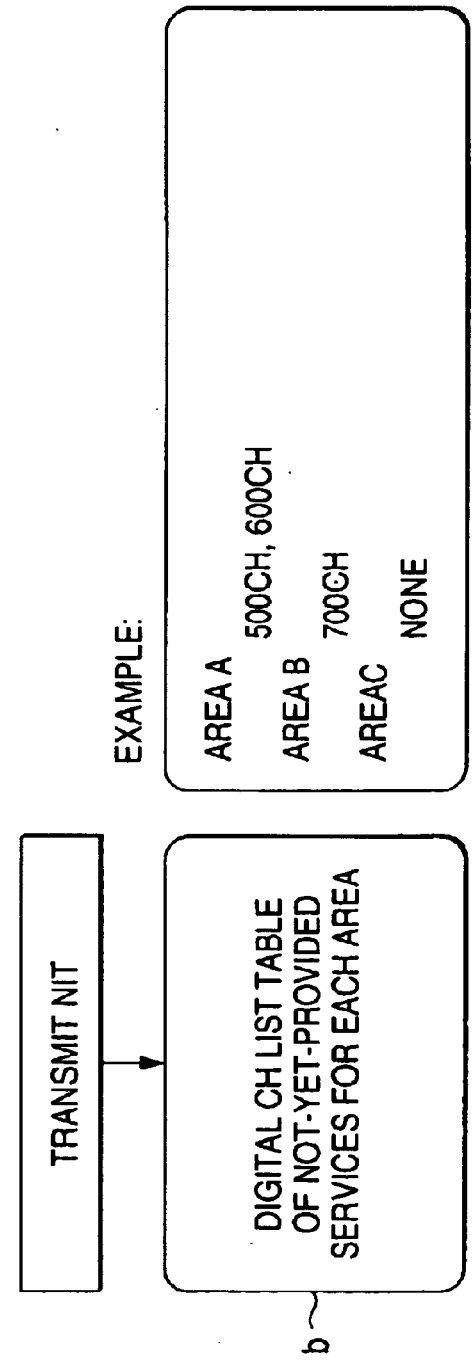
FIG. 3 is a list table for indicating digital channels of not-yet-provided services in this example.

FIG. 2 and FIG. 3 are conceptional diagrams for explaining a filtering operation performed on a terminal side of each of these areas. This filtering operation is to exclude a picture signal of a digital program which is not provided.

This filtering operation is generalized by CPUs contained in the respective terminals.

In FIG. 2, while the digital head end 10 firstly uses a data ch prepared for a data transmission, this digital head end 10 transmits EMM (Entitlement Management Message) data to the analog head ends 1A, 1B and 1C of the respective areas A, B and C. Each of these terminals receives this EMM data from each of the analog head ends 1A, 1B and 1C.

This EMM data contains an area code "a" indicative of each of related (belonging) areas. Each of the terminals may recognize their own related area by storing this area code "a".

Then, as indicated in FIG. 3, while the digital head end 10 further uses a video ch so as to transmit a picture signal, this digital head end 10 transmits NIT (Network Information Table) data to the analog head ends 1A, 1B and 1C, whereas each of the terminals receives this NIT data via the respective analog head ends 1A, 1B and 1C.

Now, in a digital broadcasting system using the transport stream (TS) of the MPEG-2, as data used in this broadcasting system, a PES packet is used. That is, an elementary stream in which both a video and an audio are digitally coded is processed in a packet form in this PES packet.

The coding process operation is standardized based upon program specific information (PSI). This program specific information (PSI) is constituted by a program association table (PAT), a TS program map table (PMT), a network information table (NIT), and an access table with a condition (CAT).

Among these tables, in the NIT, the following information is described, namely, frequency information and channel information used to switch a digital program and a channel, and information used to separate a multiplexed PES packet.

A list table "b" is contained in this NIT data, and this list table "b" indicates a digital ch (channel) of a not-yet-provided service every area.

This list table "b" of the not-yet-provided services is arranged in such a manner that digital ch-display numbers of digital programs which are not provided in the respective areas are listed up in each of these areas A, B and C among the digital programs transmitted from the digital head end 10.

A terminal of each of these areas A, B and C identifies this list table "b" of the not-yet-provided service digital ch with respect to a preset area code "a", and then prohibits a monitor to display thereon the picture of this digital program of the not-yet-provided service digital ch with respect to the picture signals to which the corresponding digital ch display numbers are attached among the picture signals of the digital programs transmitted from the digital head end 10 by employing the following means. For instance, a means which does not perform a demultiplexing operation employed in an MPEG TS demultiplexer mounted on each of the terminals may be employed.

It should be noted that as to electronic program guide (EPG) information provided from the digital head end 10 with respect to this digital program, such electronic program guide information related to a digital program of a not-yet-provided service digital ch every area is excluded on the terminal side in a similar manner so as not to be displayed on the monitor.

Figure 4:
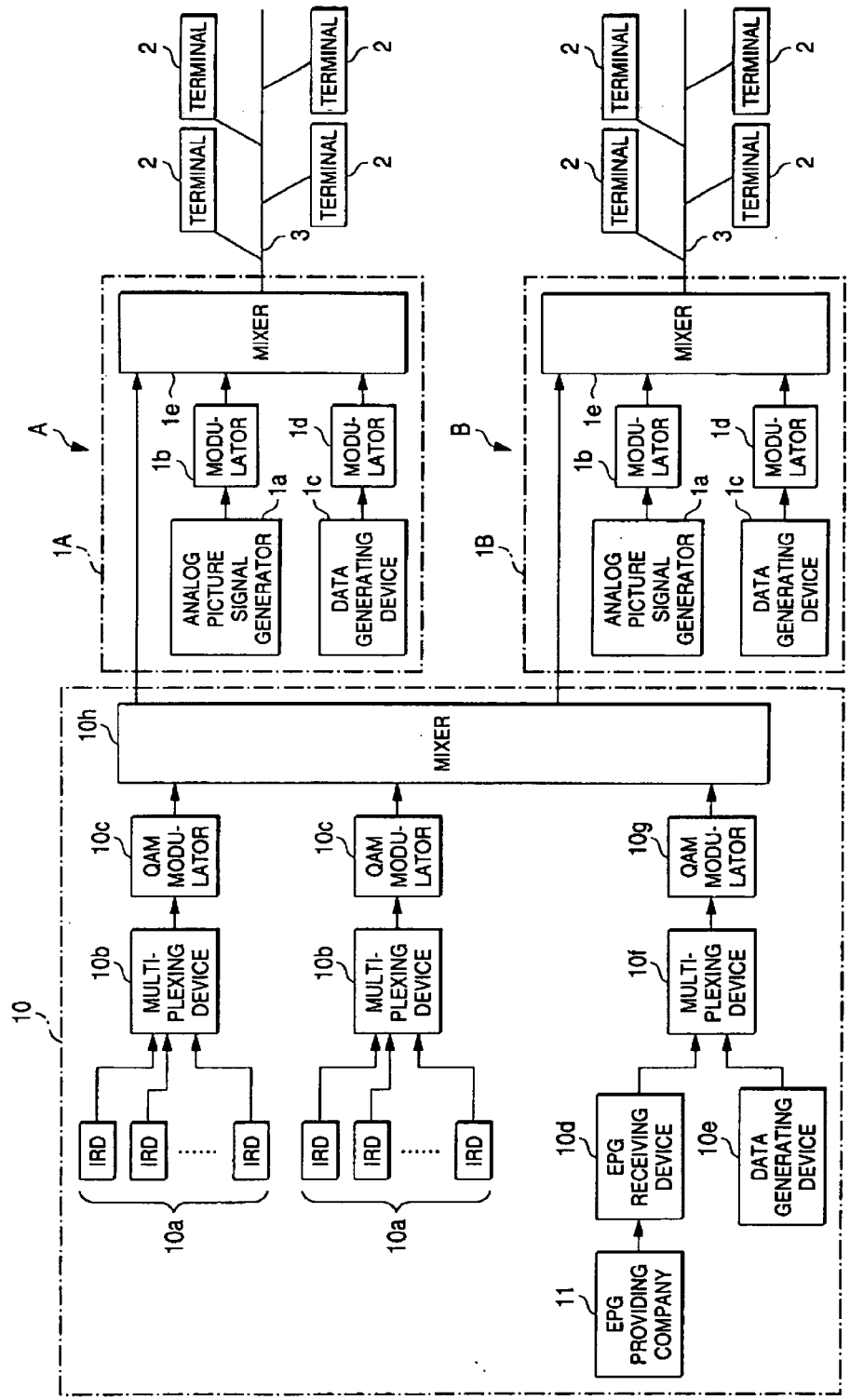
FIG. 4 is a block diagram for representing an arrangement of a digital head end and an arrangement of an analog head end employed in the system of the present invention.

FIG. 4 schematically indicates an arrangement of an analog head end and a digital head end.

In FIG. 4, the digital head end 10 is so arranged that digital picture signals supplied from a plurality of receiving devices (IRD) 10a are multiplexed by a multiplexing device 10b, and then, this multiplexed signal is QAM-modulated by a QAM modulator 10c.

A preselected number of digital picture signal distribution systems are constructed in a proper manner. This digital picture signal distribution system is arranged by the IRD 10a, the multiplexing device 10b, and the QAM modulator 10c.

Next, a description will now be made of a structure of a data signal containing EPG information.

The EPG information is received by an EPG receiving device 10d. The EPG information is regularly, or irregularly supplied from an EPG providing company 11.

On the other hand, a data generating device 10e generates other data such as conditional access information.

Then, a multiplexing device 10f multiplexes the EPG information derived from the EPG receiving device 10d and the various sorts of data generated from the data generating device 10e, and this multiplexed signal is QAM-modulated by a QAM modulator 10g.

Both the digital picture signal and the data derived from the QAM modulators 10c and 10g are mixed with each other by a mixer 10h, and then, the mixed data is transmitted through separate channels to the analog head ends 1A and 1B, respectively.

It should be noted that as previously described, both the digital picture signal and the data are multiplexed based upon the MPEG-2 standard.

In the analog head end 1A of the area A, for example, a local broadcasting signal is outputted from an analog picture signal generator 1a, this local broadcasting signal is modulated by a modulator 1b, and furthermore, data such as fee information generated by a data generating device 1c is analog-modulated by a modulator 1d.

These analog picture signal, the data derived from the modulator 1d, and both the digital picture signal and the data derived from the digital head end 10 are mixed with each other by a mixer 1e, and then, the mixed signal/data is distributed to the respective terminals 2.

It should also be noted that the analog head end 1B of the area B is constructed of a similar arrangement.

With respect to the single digital head end 10, a plurality of analog head ends 1A and 1B located in each of these areas are connected. Both the digital picture signal and the data, which are transmitted from the digital head end 10, are sent to the analog head ends 1A and 1B arranged in each of these areas A and B. Then, these digital picture signal and data are distributed via the respective analog head ends 1A and 1B to the respective terminals 2 connected to the analog head ends 1A and 1B in combination with the analog signal.

Figure 5:
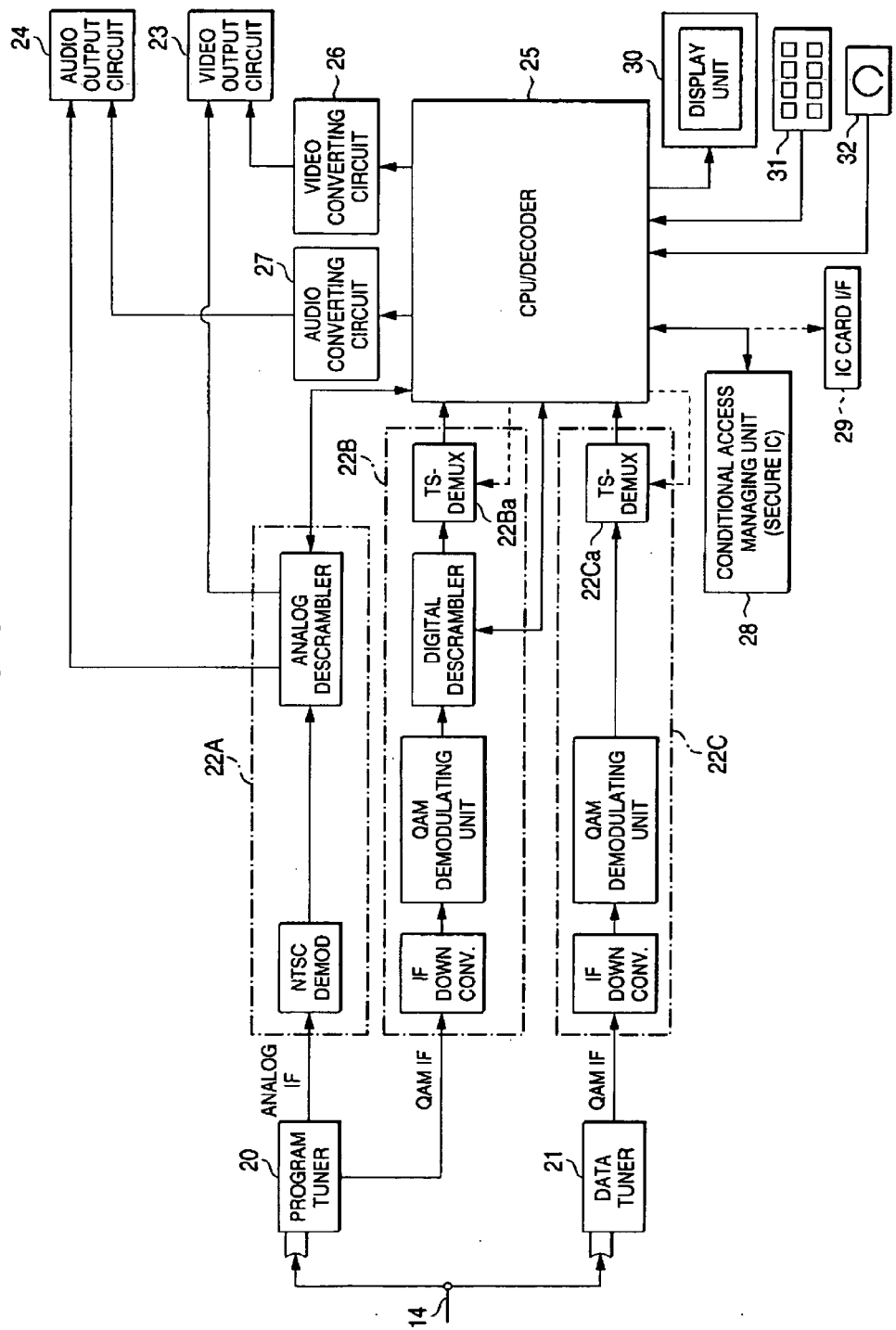
FIG. 5 is a circuit diagram of a digital terminal employed in the system of the present invention.
Figure 6:
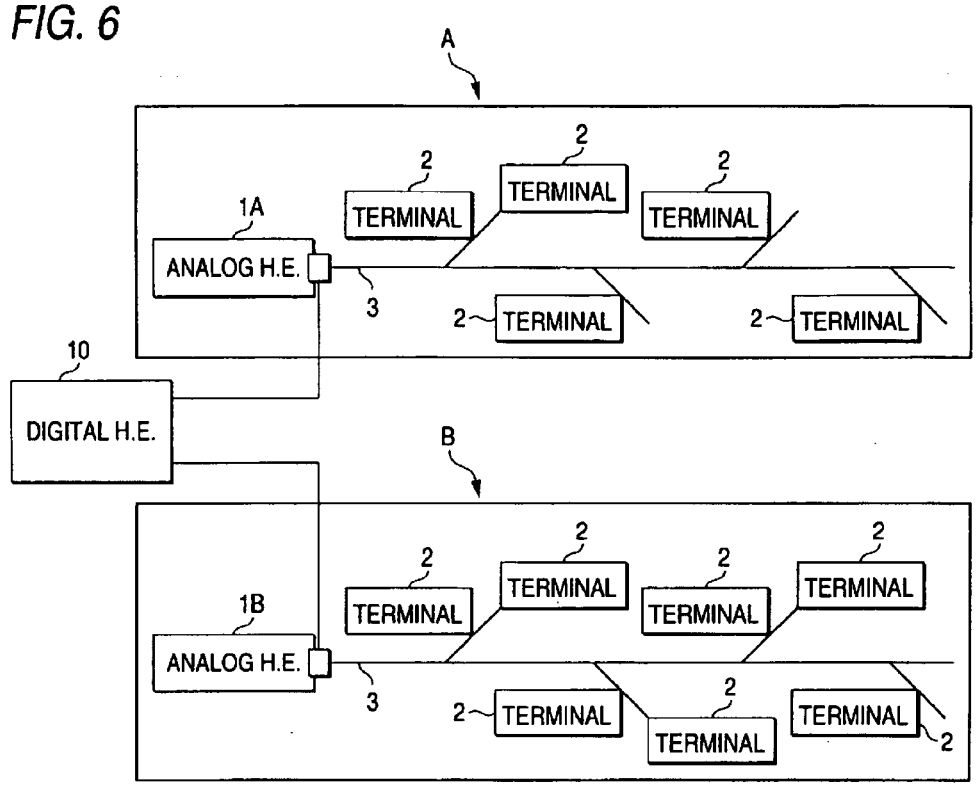
FIG. 6 is a system structural diagram for indicating an example of a digital integration type CATV.
Figure 7:
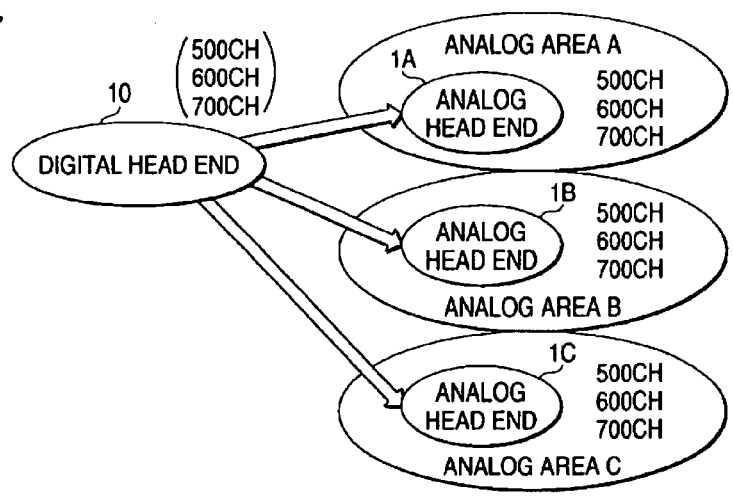
FIG. 7 is a system structural diagram for showing an example of a transmission format of a digital program in this digital integration type CATV.
Figure 8:
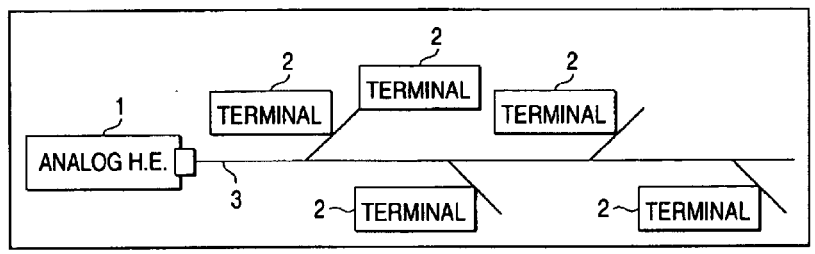
FIG. 8 is a system structural diagram for the conventional example.

FIG. 5 is a schematic block diagram for indicating an arrangement of a digital terminal of each of the areas A, B and C. The digital terminal receives a picture signal of a digital program transmitted from the digital head end 10 in the above-explained CATV conditional access system.

In FIG. 5, the picture signals 14 of the analog picture signal series distributed from the analog head ends 1A, 1B and 1C, and further, the picture signals 14 of the digital picture signal series which are transmitted via the analog head ends 1A, 1B and 1C from the digital head end 10 are distributed from a cable 3 to a tuner 20 for program and also to another tuner 21 for data.

Then, after the picture signal of the analog picture signal series which is entered into the program tuner 20 is processed by an analog picture signal processing circuit 22A, a video signal and an audio signal of this processed picture signal are outputted to a video output circuit 23 and an audio output circuit 24, respectively.

In the analog picture signal processing circuit 22A, an analog picture IF signal of the NTSC system outputted from the program tuner 20 is demodulated by an NTSC demodulator, and when the analog picture signal transmitted from the analog head end 1A is scrambled, this scrambled analog picture signal is descrambled by way of an analog descramble circuit, and thereafter the descrambled analog picture signal is entered into a CPU/Decoder 25 provided at a post stage.

Also, the picture signal of the digital picture signal series is processed by a digital picture signal processing circuit 22B, and thereafter, the processed digital picture signal is inputted to the CPU/Decoder 25.

In the digital picture signal processing circuit 22B, the digital picture IF signal which is QAM-modulated is down-converted by an IF down-converter, and then, the down-converted digital picture IF signal is demodulated by a QAM demodulator.

Then, in such a case that the digital picture signal which is transmitted from the digital head end 10 is scrambled, this scrambled digital picture signal is descrambled by a digital descramble circuit. Thereafter, a transport stream (TS) of MPEG-2 is demultiplexed by a TS-demultiplexer, and the demultiplexed transport stream is entered to the CPU/Decoder 25 provided at the post stage.

Both the digital video signal and the digital audio signal derived from this CPU/Decoder 25 are supplied via a video converting circuit 26 and an audio converting circuit 27 to the video output circuit 23 and the audio output circuit 24.

On the other hand, a digital data signal such as EPG which is inputted into the data tuner 21 is processed by a digital data signal processing circuit 22C. Thereafter, the processed digital data signal is entered to the CPU/Decoder 25. From this CPU/Decoder 25, the processed digital data signal is supplied via the video converting circuit 26 and the audio converting circuit 27 to the video output circuit 23 and the audio output circuit 24, respectively.

Similarly to the digital picture signal processing circuit 22B, in the data signal processing circuit 22C, the digital data IF signal which is QAM-modulated is down-converted by an IF down-converter, and then, the down-converted digital data IF signal is demodulated by a QAM demodulating unit.

Then, a TS-demultiplexer demultiplexes various sorts of data such as EPG data, which is multiplexed on the transport stream (TS) in accordance with the MPEG-2 standard. The demultiplexed data is entered to the CPU/Decoder 25 provided at the post stage.

It should also be noted that in FIG. 5, reference numeral 28 denotes a conditional access managing unit; 29, an IC card I/F; 30, a display unit for displaying a channel or the like; 31, an operation key input unit; and 32, a remote controller receiving unit.

Then, the above-explained list tables "b" of the not-yet-provided service digital ch are stored into the CPU/decoder 25 respectively, and are contained in the area code "1a" and the NIT. This CPU/Decoder 25 controls the MPEG TC demultiplexer 22Ba for constituting the digital picture signal processing circuit 22B in such a manner that this MPEG TC demultiplexer 22Ba does not perform the demultiplexing operation with respect to the picture signal of the not-yet-provided service digital ch by identifying the area "a" with the list table "b".

As previously explained, since the picture of the not-yet-provided service digital program is not completely displayed on the monitor in each of these areas A, B and C, the viewers need not recognize presence of such a digital program of the not-yet-provided service. Accordingly, there is no risk that the viewers propose to monitor such a digital program of the not-yet-provided service.

Similarly to the above-explained information, as to the EPG information related to the digital program of the not-yet-provided service, the CPU/Decoder 25 controls the MPEG TC demultiplexer 22Ca which constitutes the digital data signal processing circuit 22C in such a manner that this MPEG TC demultiplexer 22Ca does not perform the demultiplexing operation of the EPG information.

What is claimed is:

1. A CATV conditional access system comprising a digital head end for transmitting picture signals of digital programs to terminals provided in a plurality of areas, and a plurality of analog head ends in the respective areas, each analog head end transmitting both the picture signals of digital programs transmitted from the digital head end and picture signals of analog programs to terminals belonging to each area, wherein:

said digital head end transmits an area code allocated to each area to the terminals provided in each area, which is used to recognize an area to which each of the terminals belongs, said digital head end commonly transmits program data to the terminals provided in each area, said program data containing identifying data that indicates digital programs of not-yet-provided services for the plurality of areas and information regarding the digital programs, wherein each of the terminals identifies said area code and said program data and excludes a picture signal of a digital program of a not-yet-provided service from the picture signals of the digital programs transmitted from said digital head end in such an area to which the terminal belongs, and wherein said area code is transmitted to the terminals separately from said program data.

2. The CATV conditional access system as claimed in claim 1, wherein said terminal identifies said area code and said program data so as not to display a picture of a relevant digital program by not demultiplexing a multiplexed picture signal of said relevant digital program among a plurality of multiplexed digital picture signals.

3. The CATV conditional access system as claimed in claim 1, wherein said terminal identifies said area code and said program data so as to exclude electronic program guide information related to the digital program of the not-yet-provided service from electric program guide information transmitted from said digital head end.

4. The CATV conditional access system as claimed in claim 1, wherein network information data and program guide information data are sent simultaneously with the program data, to the terminals provided in each area.

5. The CATV conditional access system as claimed in claim 1, wherein said identifying data comprises a list of digital programs of not-yet-provided services.

6. A CATV conditional access method comprising:

providing a digital head end for transmitting picture signals of digital programs to terminals provided in a plurality of areas, providing a plurality of analog head ends in the respective areas, each analog head end transmitting both the picture signals of digital programs transmitted from the digital head end and picture signals of analog programs to terminals belonging to each area, transmitting through said analog head ends an area code allocated to each area to the terminals provided in each area, which is used to recognize an area to which each of the terminals belongs, commonly transmitting program data to the terminals provided in each area, said program data containing identifying data that indicates digital programs of not-yet-provided services for the plurality of areas and information regarding the digital programs, and identifying said area code and said program data so as to exclude a picture signal of a digital program of a not-yet-provided service from the picture signals of the digital programs transmitted from said digital head end in such an area to which the terminal belongs, wherein said area code is transmitted to the terminals separately from said program data.

7. The CATV conditional access method as claimed in claim 6, wherein said identifying data comprises a list of digital programs of not-yet-provided services.

* * * * *